H. S. BUSBY.
DIPPING WHEEL.
APPLICATION FILED JUNE 30, 1913.

1,102,135.

Patented June 30, 1914.

Witnesses
Philip R. Hough
J. W. Sherwood

Inventor
Harley S. Busby,
By Franklin N. Hough
Attorney

UNITED STATES PATENT OFFICE.

HARLEY S. BUSBY, OF WASHINGTON, IOWA.

DIPPING-WHEEL.

1,102,135.

Specification of Letters Patent.   Patented June 30, 1914.

Application filed June 30, 1913.   Serial No. 776,679.

*To all whom it may concern:*

Be it known that I, HARLEY S. BUSBY, a citizen of the United States, residing at Washington, in the county of Washington and State of Iowa, have invented certain new and useful Improvements in Dipping-Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in "dip wheels" such as are adapted for use in applying disinfecting liquid or medicines in liquid form to hogs and other animals, the liquid being contained within a receptacle from which it is carried by capillary attraction to a convenient point at which the animal will contact with it.

The present invention resides in the provision of an open trough designed to receive the liquid, the said trough having loosely pivoted therein a disk or wheel surrounded by a series of ropes or other band or bands of fibrous material adapted, through capillary attraction, to convey the liquid and to become saturated therewith.

To these ends and to such others as the invention may pertain, the same consists in the peculiar construction and in the novel combination, arrangement and adaptation of parts, all as more fully hereinafter described, shown in the accompanying drawings and then specifically defined in the appended claim.

I illustrate my invention in the accompanying drawings, in which:—

Figure 1:
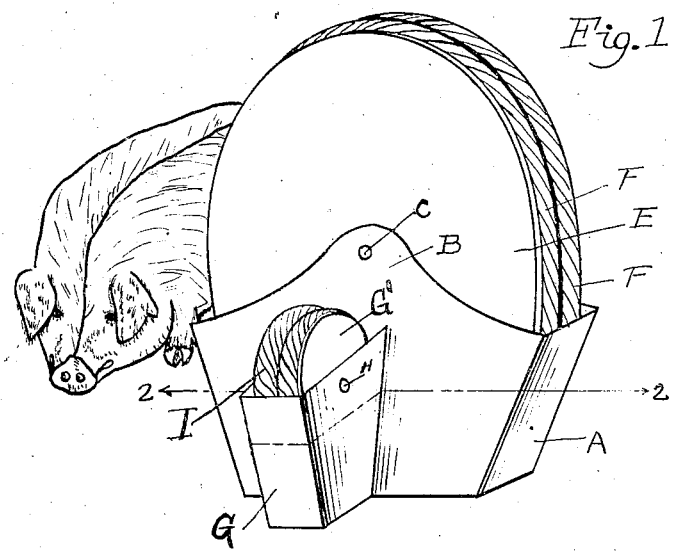
Figure 2:
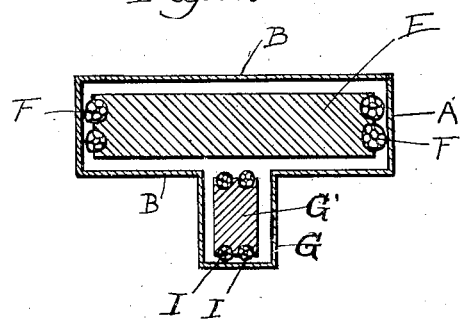

Figure 1 is a perspective view of a device constructed in accordance with my invention, and Fig. 2 is a horizontal section taken upon the line 2—2 of Fig. 1.

Reference now being had to the details of the drawings by letter, A represents the trough or receptacle within which is loosely pivoted a disk E, the said disk being centrally pivoted upon a transverse shaft C extended through the ears B rising from the side walls of the receptacle. Extending around the outer periphery of the disk are ropes F, F. It will be noted that said ropes are adapted, when the wheel carrying the same rotates, to wipe against the inclined end of the receptacle in which the wheel turns.

G designates an auxiliary trough, the lower portion of which communicates with the interior of the primary trough A and within the said auxiliary trough G is loosely pivoted a disk G' which, like the larger disk E, is journaled upon the transverse pivot or axle H, the said disk being also provided with peripheral bands I, similar in all respects to the bands E upon the larger wheel.

The operation of the device will at once be readily understood. The medicine or liquid compound which it is desired to use is placed within the trough A, the trough being filled to a point above the lower edges of the wheels E and G respectively, the said wheels being loosely pivoted will readily turn when an animal in rubbing comes in contact therewith, thus insuring the bands or ropes or other fibrous material surrounding the disk being at all times thoroughly saturated with the medicine and the liquid contained in the ropes thus saturated will be transferred to the back of an animal coming in contact therewith. The movements of the animal in rubbing against the periphery of the disk will serve to automatically turn the wheel so as to present a new rubbing surface or point of contact.

The auxiliary tank or trough G with its disk therein is so positioned with reference to the main trough as to present a rubbing surface for small animals at a point below the point at which the larger disk is exposed.

While I have shown and described ropes used as bands upon the disks or wheels and I prefer this construction, it will at once be noted that a felt covering, a web belt or a belt of any suitable fabric adapted for the purpose may be substituted. Oil or any suitable liquid insecticide may be employed within the receptacle.

It will be noted that, by the provision of a device such as I have described, a convenient means is afforded whereby liquid carried by capillary attraction through the bands upon the wheels may be readily transmitted to an animal which in rubbing against the periphery of the wheel will serve to rotate it.

What I claim to be new is:—

A dipping wheel comprising a trough-shaped receptacle with inclined ends, the opposite sides projecting above the ends and apertured, a pin projecting through said aperture, a grooved wheel journaled upon said pin, a rope wound tightly about the circumference of the wheel and designed to turn within the receptacle and wipe against the inclined ends of the trough-shaped receptacle, as set forth.

In testimony whereof I hereunto affix my signature in presence of two witnesses.

HARLEY S. BUSBY.

Witnesses:
T. W. HARWOOD,
W. E. RILEY.